Figure 1:
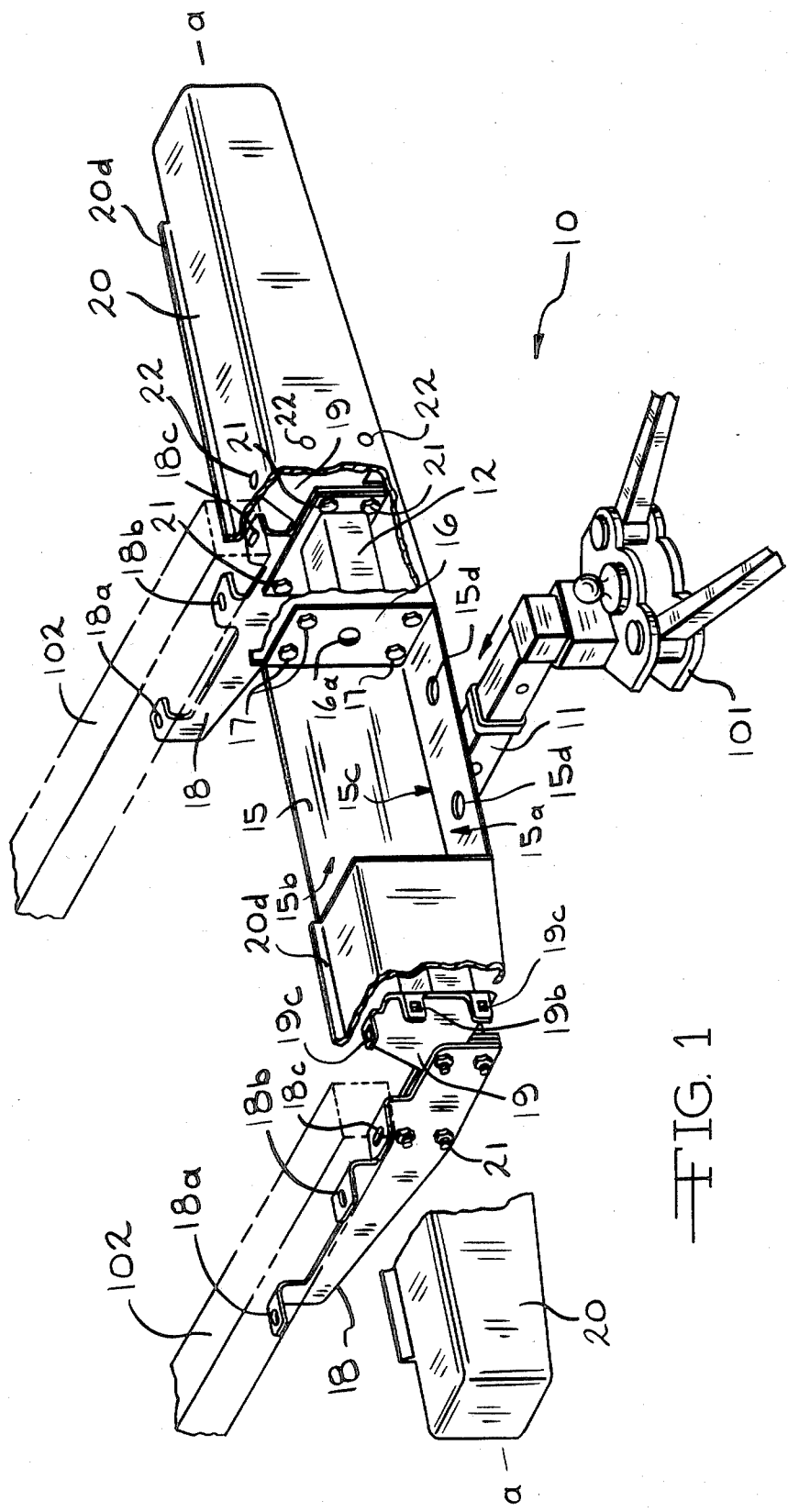

United States Patent [19]

Putnam

[11] Patent Number: 4,738,464

[45] Date of Patent: Apr. 19, 1988

[54] COMBINED BUMPER AND RECEIVER TRAILER HITCH ASSEMBLY

[75] Inventor: Rex D. Putnam, Bronson, Mich.

[73] Assignee: Putnam Manufacturing, Bronston, Mich.

[21] Appl. No.: 30,468

[22] Filed: Mar. 26, 1987

[51] Int. Cl.[4] ............................................. B60R 19/24
[52] U.S. Cl. ................................... 280/500; 280/505; 293/117
[58] Field of Search ............... 280/400, 500, 505, 511; 293/106, 107, 117, 102

[56]  References Cited

U.S. PATENT DOCUMENTS 3,137,516  6/1964  Cline ..................................... 280/505
3,471,070  10/1969  Olson ................................ 280/164 R
3,578,358  5/1971  Reynolds ............................. 280/500
3,606,385  9/1971  Johannes ............................. 280/422
3,682,360  8/1972  Fletcher et al. .................... 280/505

Primary Examiner—John J. Love
Assistant Examiner—Mitchell J. Hill
Attorney, Agent, or Firm—Ian C. McLeod

[57]  ABSTRACT

A combined receiver trailer hitch and bumper assembly (10) is described. The assembly includes a receiver (11) and bar (12) attached to first extensions (18) to be secured to a frame (102) as in a conventional trailer hitch. End portions (16) on an angle plate (15) and second extensions (19) forward of the first extensions removeably support bumpers (20). The assembly allows easy replacement of the bumpers and an aesthetically pleasing appearance to the trailer hitch.

10 Claims, 3 Drawing Sheets

U.S. Patent Apr. 19, 1988 Sheet 3 of 3 4,738,464

COMBINED BUMPER AND RECEIVER TRAILER HITCH ASSEMBLY

BACKGROUND OF THE INVENTION (1) Field of the Invention

The present invention relates to a combined receiver hitch and bumper assembly particularly adapted for pickup trucks. In particular the present invention relates to an assembly wherein the trailer hitch is concealed by the bumper except for the receiver.

(2) Prior Art

The prior art has described ball hitches bolted to a bumper particularly a truck bumper. Thus U.S. Pat. No. 3,137,516 to Cline; 3,471,070 to Olson; 3,606,385 to Johannes and 3,682,360 to Fletcher et al describe this type of trailer hitch and bumper combination. This type of trailer hitch assembly is suitable only for very light loads and does not function as a weight distributing hitch. Also the complete bumper must be replaced if it is damaged such as in a collision.

For heavy loads, a receiver hitch for a bar supporting the ball is necessary. The hitch is mounted on the vehicle frame. Bumper and trailer receiver hitch assemblies are known but they are of a unitary welded construction requiring that the whole assembly be replaced in the event of damage. So far as it is known a combined receiver hitch and bumper assembly with two separate bumpers and supports along the rear of the vehicle capable of handling a maximum gross trailer weight load of 12,000 pounds in weight distributing application, which can be unbolted and replaced is unknown.

OBJECTS

It is therefore an object of the present invention to provide a combined bumper and hitch assembly with two replaceable bumpers as well as extensions supporting the bumpers. Further it is an object of the present invention to provide an assembly which is aesthetically pleasing in that it covers the trailer hitch except for the receiver. Further still it is an object of the present invention to provide an assembly which is relatively inexpensive to construct and assemble. These and other objects will become increasingly apparent by reference to the following description and the drawings.

IN THE DRAWINGS

FIG. 1 is a front separated perspective view of the bumper and trailer hitch assembly 10 of the present invention with a receiver 11, particularly illustrating the mounting of the bumpers 20 on end portions 16 of an angle plate 15 and to the bar 12 by second extensions 19.

Figure 2:
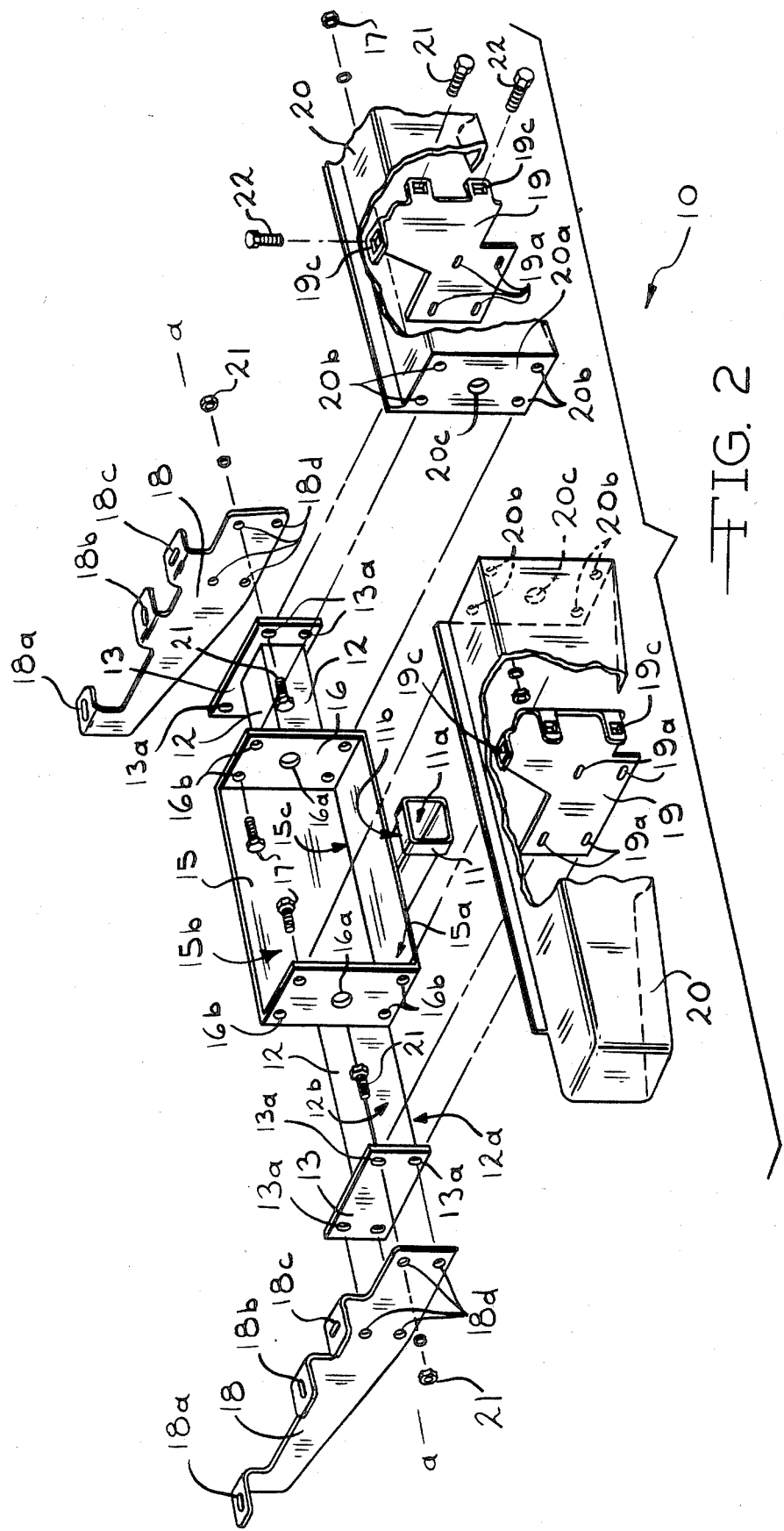

FIG. 2 is another front separated perspective view of the assembly 10 shown in FIG. 1.

Figure 3:
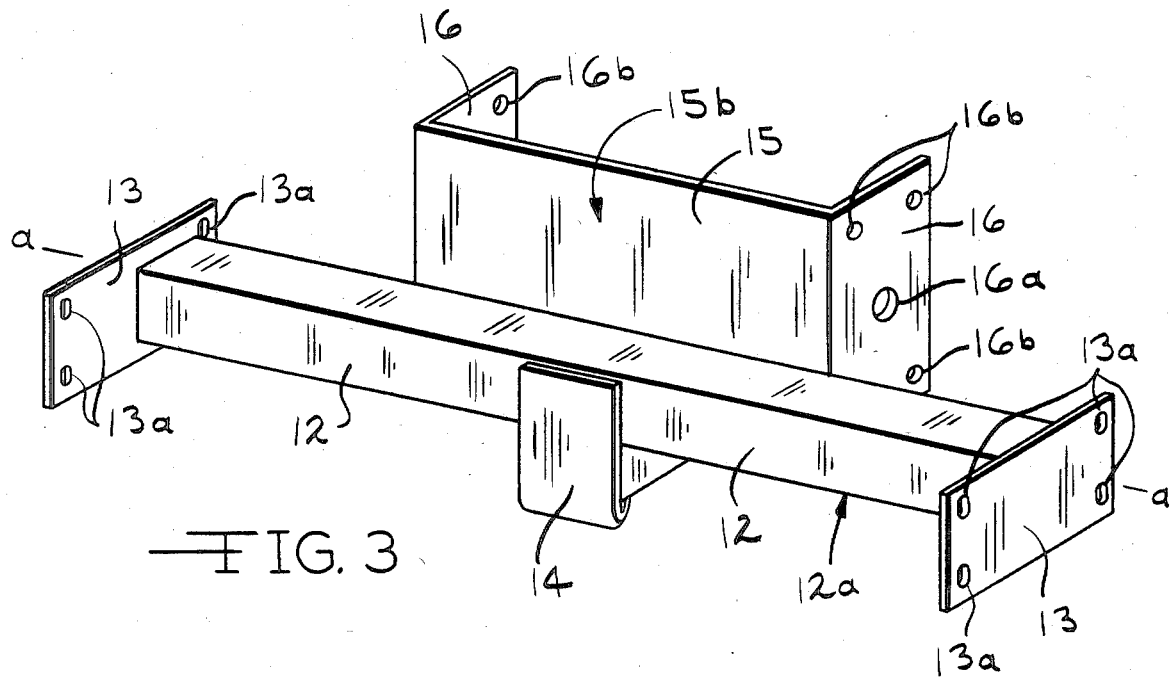

FIG. 3 is a rear perspective view of the bar 12 supporting the receiver 11 particularly illustrating a cover plate 14 for the rear of the receiver 11.

Figure 4:
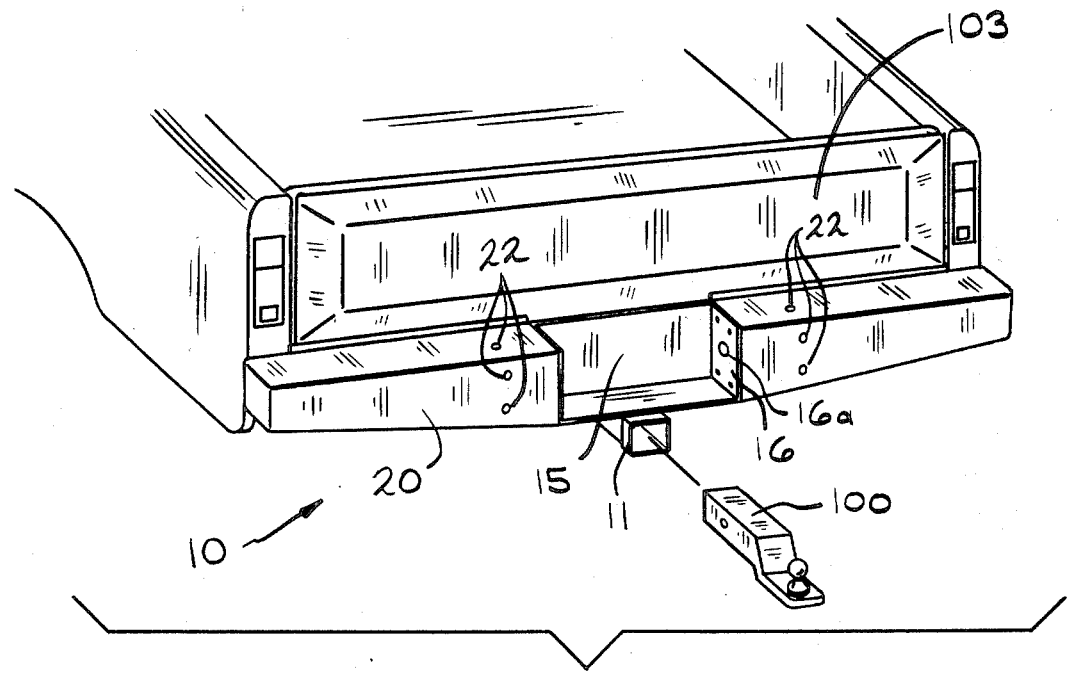

FIG. 4 is a front perspective view of the bumper mounted on the rear of a pickup truck 103.

GENERAL DESCRIPTION

The present invention relates to a weight distributing receiver trailer hitch and bumper assembly for rear attachment to a frame of a towing vehicle which comprises: a receiver hitch for a trailer including spaced apart first extension means for securing the hitch to the frame of the vehicle, a bar means mounting the extension means at opposed ends of the bar means and a receiver means mounted on the bar means between the first extension means with an opening facing towards the trailer for insertion and mounting of a ball mount bar; an angle plate means mounted on the bar means and above and on the receiver means with spaced apart opposed end portions perpendicular to the bar means defining an opening for mounting a license plate; second extension means mounted on the ends of the bar means adjacent to and extending away from the first extension means; and bumpers removably mounted on the opposed end portions of the angle plate means and also removably secured to the second extension means.

Thus the present invention relates to a unique integrated bumper and receiver trailer hitch assembly, particularly adapted which allows easy replacement of either or both of the bumpers by unbolting them from the assembly.

SPECIFIC DESCRIPTION

FIGS. 1 to 4 show the improved trailer hitch and bumper assembly 10 of the present invention. The assembly 10 is adapted to mount a ball mount hitch 100 (FIG. 4) or a weight distributing hitch 101 in a receiver 11 with a mating opening 11a. The receiver 11 is mounted perpendicular to the longitudinal axis a-a of a bar 12 so that the receiver 11 overlaps the bottom side 12a of the bar 12 and the underside of a horizontal portion 15a of an angle plate means 15. Rectangular end plates 13 are secured to the ends of the bar 12 and are provided with openings 13a at each corner of the plates 13. Opposite the opening 11a, a rear support cover 14 (FIG. 3) is secured to bar 12 to close the receiver 11 and provides added strength. The angle plate 15 is mounted on a side 12b of the bar 12 and on the uppermost side 11b of the receiver 11. The angle plate 15 includes the horizontal portion 15a secured to the top portion 11b of the tube 11 and a vertical portion 15b secured to the side 12b of the bar 12 adjacent a right angle 15c. The vertical portion 15b acts to support a license plate (not shown). The horizontal portion 15a includes openings 15d for trailer safety chain hookup (not shown). End portions 16 are secured opposite each other on angle plate 15 perpendicular to the vertical portion 15b and horizontal portion 15a. An opening 16a is provided on each end portion 16 for a license plate light (not shown). Openings 16b are provided for bolts 17.

First extension means 18 are mounted on end plates 13 and are secured to frame 102 by means of tabs 18a, 18b and 18c and bolts (not shown). Openings 18d are provided for bolts 21. Second extensions 19 are positioned adjacent to and extend away from the first extensions 18 and are bolted by bolts 21 to end plates 13 through openings 19a and provide for mounting of bumpers 20. The bumpers 20 have end portions 20a with holes 20b which are secured to end portions 16 by means of bolts 17 through holes 16b. Openings 20c are for side lights and mate with openings 16a. Carriage bolts 22 secure the second extensions 19 to the bumper 20 by means of tabs 19c. Extensions 20d are provided for appearance on the bumper 20.

As can be seen, the bumper and trailer hitch assembly 10 allows easy replacement of the bumpers 20 if they are damaged. The angle plate 15 and end portions 16 define a license plate frame. The assembly 10 provides a finished appearance to an otherwise unattractive trailer hitch.

It is intended that the foregoing description be only illustrative of the present invention and it is intended that the invention only be limited by the hereinafter appended claims.

I claim:

1. A weight distributing receiver trailer hitch and bumper assembly for rear attachment to a frame of a towing vehicle which comprises:
   (a) a receiver hitch for a trailer including spaced apart first extension means for securing the hitch to the frame of the vehicle, a bar means having an underside and a rearward facing side adjacent to the underside, the bar means mounting the first extension means at opposed ends of the bar means and a receiver means having a top bottom and sides, mounted on the underside of the bar means between the first extension means with a rearward facing opening in the receiver means for insertion and mounting of a ball mount bar;
   (b) an angle plate means fixedly mounted on the top of the receiver means, the angle plate means being provided with spaced apart opposed end portions defining an opening for mounting a license plate wherein the end portions are closer together than the extension means on the bar means;
   (c) second extension means mounted on the ends of the bar means adjacent to and extending away from the first extension means; and
   (d) a pair of bumpers removably mounted on the opposed end portions of the angle plate means and also removably secured to the second extension means.

2. The assembly of claim 1 wherein each of the bumpers is secured to the end portions of the angle plate means and to the second extension means by threaded attachment means.

3. The assembly of claim 1 wherein each of the bumpers have end mounting surfaces which mate with the end portions on the angle plate means and wherein the end mounting surface and one end portion of the angle plate means for each bumper are secured together by threaded fastening means.

4. The assembly of claim 3 wherein each of the end mounting surface of the bumper and the end portions of the angle plate means have openings for mounting license plate lights.

5. The assembly of claim 1 wherein the first and second extension means are secured to the bar means by means of threaded attachment means through end plates secured to the ends of the bar means.

6. The assembly of claim 1 wherein the bumpers have end mounting surfaces which mate with the end portions on the angle plate means and are secured together by threaded attachment means, wherein the first and second extension means are secured to the bar means by means of threaded attachment means through end plates secured to the ends of the bar means and wherein the bumpers are secured to the second extension means by threaded attachment means.

7. The assembly of claim 6 wherein the end mounting surfaces of the bumper and the end portions of the angle plate means have openings for license plate lights.

8. The assembly of claim 6 wherein the end portions of the angle plate means and the end mounting surfaces of the bumpers each have a rectangular face with four corners.

9. The assembly of claim 8 wherein the corners of the end portions and end mounting surfaces have holes mounting the threaded fastening means.

10. The assembly of claim 1 wherein the bumpers essentially have a three sided box shaped cross-section.

* * * * *